(12) United States Patent
Gendre et al.

(10) Patent No.: US 6,571,539 B2
(45) Date of Patent: Jun. 3, 2003

(54) PACKAGING MACHINE AND METHOD OF CARTON SET UP

(75) Inventors: Patrick Gendre, Deols (FR); Pascal Martini, Le Poinconnet (FR); Pierre Genty, Chateauroux (FR)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 10/029,445

(22) Filed: Oct. 22, 2001

(65) Prior Publication Data

US 2002/0088206 A1 Jul. 11, 2002

Related U.S. Application Data

(63) Continuation of application No. PCT/US00/11010, filed on Apr. 24, 2000.

(30) Foreign Application Priority Data

Apr. 22, 1999 (GB) .............................................. 9909335

(51) Int. Cl.$^7$ ................................................ B65B 43/08
(52) U.S. Cl. ........................ 53/456; 53/376.4; 53/377.2; 53/378.3; 53/491; 53/566
(58) Field of Search ............................ 53/376.4, 376.7, 53/377.2, 378.3, 377.5, 377.6, 377.8, 491, 566; 493/70, 71, 72, 80, 81, 183, 453, 177

(56) References Cited

U.S. PATENT DOCUMENTS 3,602,107 A * 8/1971 Zimmer et al. ............. 493/177
4,805,375 A * 2/1989 Langen et al. ................ 53/142

* cited by examiner

Primary Examiner—Hemant Desai
(74) Attorney, Agent, or Firm—Michael V. Drew

(57) ABSTRACT

A carton manipulating device for rotating a carton in a packaging machine, which apparatus comprises carton pick up means adapted to engage at least one carton from the infeed stream and to convey the carton through a working reach of the apparatus and wherein the pick up means is rotatable intermittently along the working reach to cause the carton to be rotated during continuous forward movement.

6 Claims, 15 Drawing Sheets

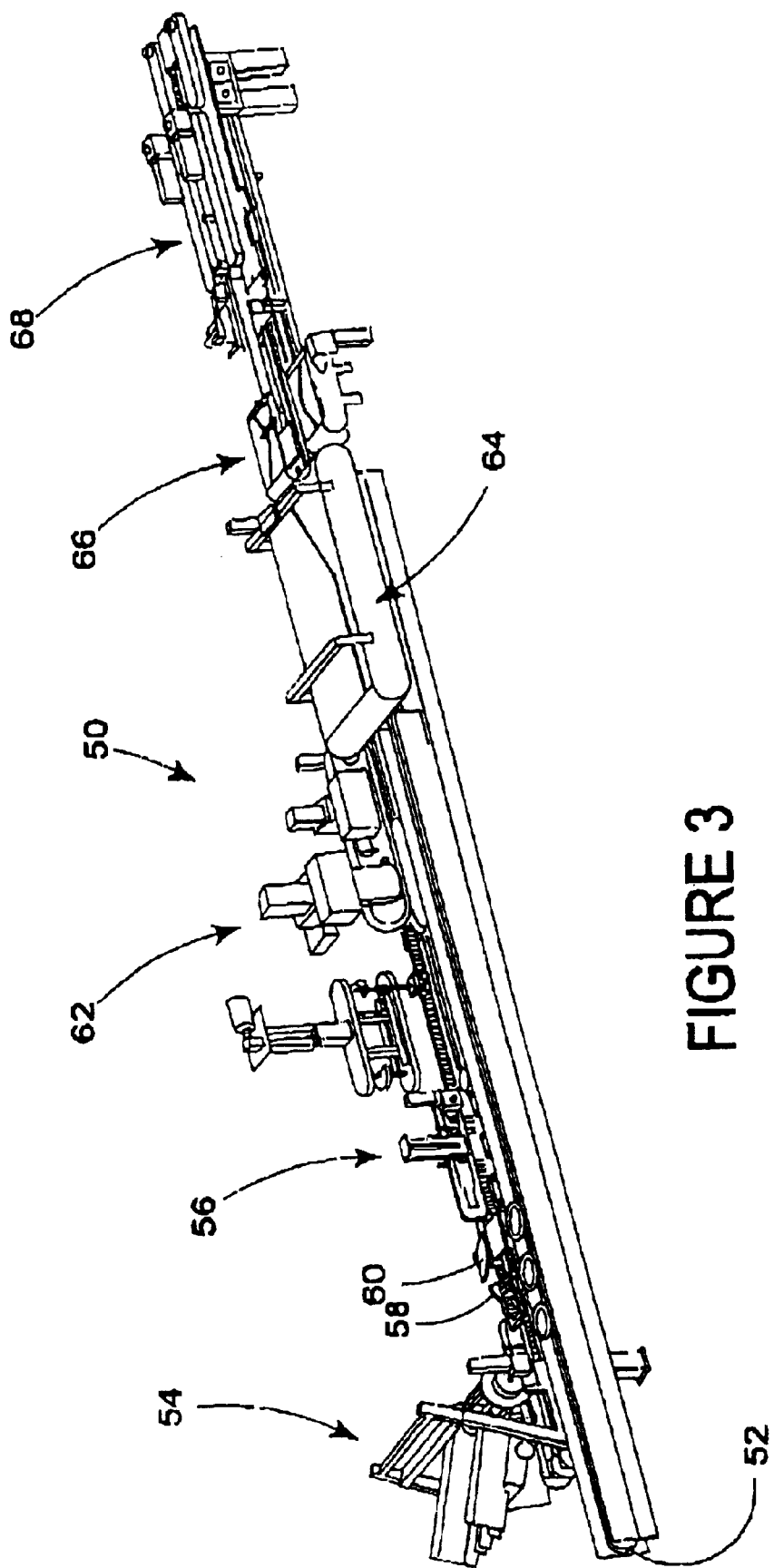

PACKAGING MACHINE AND METHOD OF CARTON SET UP

CROSS-REFERENCE TO RELATED APPLICATIONS

This is a continuation of international application No. PCT/US00/11010, filed Apr. 24, 2000, which is pending at the time of filing hereof, and which international application claims foreign priority based upon United Kingdom patent application serial number 9909335.3, filed Apr. 22, 1999.

BACKGROUND OF THE INVENTION

This invention relates to a packaging machine which is especially suitable for processing packs from blank to completed filled cartons. The machine is readily adjustable to accommodate various carton types without undue time being taken to adapt the machine from running one type of carton to running a different type of carton.

The majority of known packaging machines are dedicated machines which construct only one size of one type of carton. Therefore, modern packaging plants are required to use a plurality of packaging machines to package different carton types, each machine taking up considerable floor space and being expensive to both purchase and operate.

A limited number of packaging machines are capable of packaging different sizes of carton particularly in the beverage industry. All such machines require adjustment when switching from one size of carton to another. This adjustment includes the manual removal of all of the cartons within the packaging machine and possibly the mechanical adjustment of components in the machine. During this change over period, which can be thirty minutes or more, a machine cannot be used (known as "down time"), which is an expensive delay in a bottling plant. Such a delay may even result in down time for the entire bottling line, not just the packaging machine, if problems arise during the change over procedure.

Further, the processing time of loading one type of carton may be different to the loading of a second carton type.

It is an object of the present invention to provide a packaging machine which overcomes the technical and commercial disadvantages of known packaging machines and is capable of packaging larger articles, for example pizzas.

It is a further object of the present invention to provide a packaging machine which is capable of switching from one carton type or size to another with a minimal down time.

The present invention seeks to overcome these commercial disadvantages by providing one machine which is able to set up and load more than one type of carton.

One aspect of the invention provides a carton manipulating device for rotating a carton in a packaging machine, which apparatus comprises carton pick up means adapted to engage at least one carton from the infeed stream and to convey the carton through a working reach of the apparatus and wherein the pick up means is rotatable intermittently along the working reach to cause the carton to be rotated during continuous forward movement. Preferably, the pick up means may be mounted to a cam track, wherein the cam track provides a path to cause the pick up means to rotate.

According to an optional feature of this aspect of the invention the carton pickup means may comprise at least one suction cup.

According to another optional feature of this aspect of the invention the pick-up means may rotate through substantially 90°.

According to another optional feature of this aspect of the invention a vacuum break may be provided to cause the suction cups to release the carton at the downstream end of the working reach. Preferably, the carton may be released in such a position to permit the side loading of the carton with at least one article.

A second aspect of the invention provides a carton manipulating device further comprising a variable speed conveyor for increasing or decreasing the manipulated carton speed to compensate for a change in carton pitch.

A third aspect of the invention provides an apparatus arranged to reposition substantially side facing flaps on cartons being transported along a feed path, the apparatus comprising two or more lugs arranged to move along a predetermined path, the apparatus being operable such that a lug is periodically positioned in the feed path in front of the carton causing the carton to contact the lug and reposition the leading side flap, the apparatus being further operable periodically to increase the velocity of the lugs so as to bring a second lug into contact with the carton to reposition the trailing side flap. Preferably, the locus may be defined by a single variable speed continuous belt to which the lugs are attached. More preferably, the continuous belt may be driven by servomotor drive means.

According to an optional feature of the third aspect of the invention the transverse position of the lug relative to the carton perpendicular to the carton feed direction may be determined by cam means. Preferably, the cam means may comprise a fixed cam track in which a cam follower attached to the lug slidably fits. More preferably, the cam track may be arranged so as to move the lugs from a retracted to a deployed position at the location where the side flaps are repositioned.

According to another optional feature of the third aspect of the invention the apparatus may comprise a control means arranged to control the speed of said lug or lugs. Preferably, the control means may comprise means for receiving information regarding the speed of cartons in the feed path.

According to another optional feature of the third aspect of the invention the control means may comprise a manual input means.

According to a further optional feature of the third aspect of the invention the control means may comprise a sensor arranged to measure the speed of cartons in the feed path.

According to a still further optional feature of the third aspect of the invention the apparatus may have a sensor arranged to measure the speed of the lug or lugs.

According to yet another optional feature of the third aspect of the invention the control means may vary the speed of the lug or lugs to lie within the range plus or minus 1–30% of the speed of said cartons traversing said feed path.

A fourth aspect of the invention provides a method of continuously setting up and loading sleeve type cartons with articles, for example, pizzas comprising the steps of: conveying the articles through the machine, feeding successive cartons from a supply in a flat collapsed condition to a setting up station, folding the carton into a set up tubular condition, supporting the carton as it moved downstream so that is maintained in a set up condition, loading at least one article into one or both ends of the carton, folding the corners of the carton, and securing the end walls of the carton to the carton. Preferably, the corners are bevelled.

A fifth aspect of the invention provides a packaging machine for continuously setting up and loading sleeve type cartons with articles, for example, pizzas comprising opposed side and end walls which machine comprises an article conveyor for conveying the articles through the machine, carton feed apparatus sequentially to deliver successive cartons from a supply in flat collapsed condition to a setting up station of the machine, panel folding devices to fold the carton into a set up tubular condition, support means adapted to be brought into contact with the carton during movement downstream so that the carton is maintained in a set up condition and an article loading apparatus for loading at least one article into one or both ends of the carton, wherein there further comprises a corner folding apparatus and end wall securing apparatus for sealing the carton.

A sixth aspect of the invention provides control means for controlling the carton manipulating device of the first aspect of the invention, the apparatus of the third aspect of the invention or the packaging machine of the firth aspect of the invention.

There may further comprise control means for a packaging machine of the fifth aspect of the invention comprising a central processor for controlling the article conveyor, carton feed apparatus, panel folding devices, carton support means and corner folding apparatus and end wall securing apparatus.

A seventh aspect of the invention provides a control system for controlling the operation of a packaging machine in order to change from a first carton to second carton comprising the steps of: moving the article set up devices into operative positions, stopping the carton manipulating device and moving it to an inoperative position, starting the set up device, synchronising the speeds of endless chains and suction cups with conveyor, synchronising the conveyor speeds of the second conveyor and overhead conveyor with the first conveyor, stopping the corner repositioning apparatus, and restarting the carton picking and transporting process and the supply of articles.

Preferably, the speed of supply of articles may be alterable as required depending on the size or type of cartons in each of said hoppers. More preferably, the relative positions and state of motion of each of the moveable components may be sensed using individual sensors and transmitted to the control means.

Exemplary embodiments of the invention will now be described by way of example only, with reference to accompanying drawings in which:

BRIEF DESCRIPTION OF THE SEVERAL VIEWS OF THE DRAWINGS

FIG. 1b is a perspective view of the carton of the type shown in FIG. 1a;

FIG. 2b is a perspective view of an erected and loaded carton of the type illustrated in FIG. 2a;

FIG. 3 is a perspective view of a machine according to one aspect of the invention;

DETAILED DESCRIPTION OF THE INVENTION

Figure 1A:
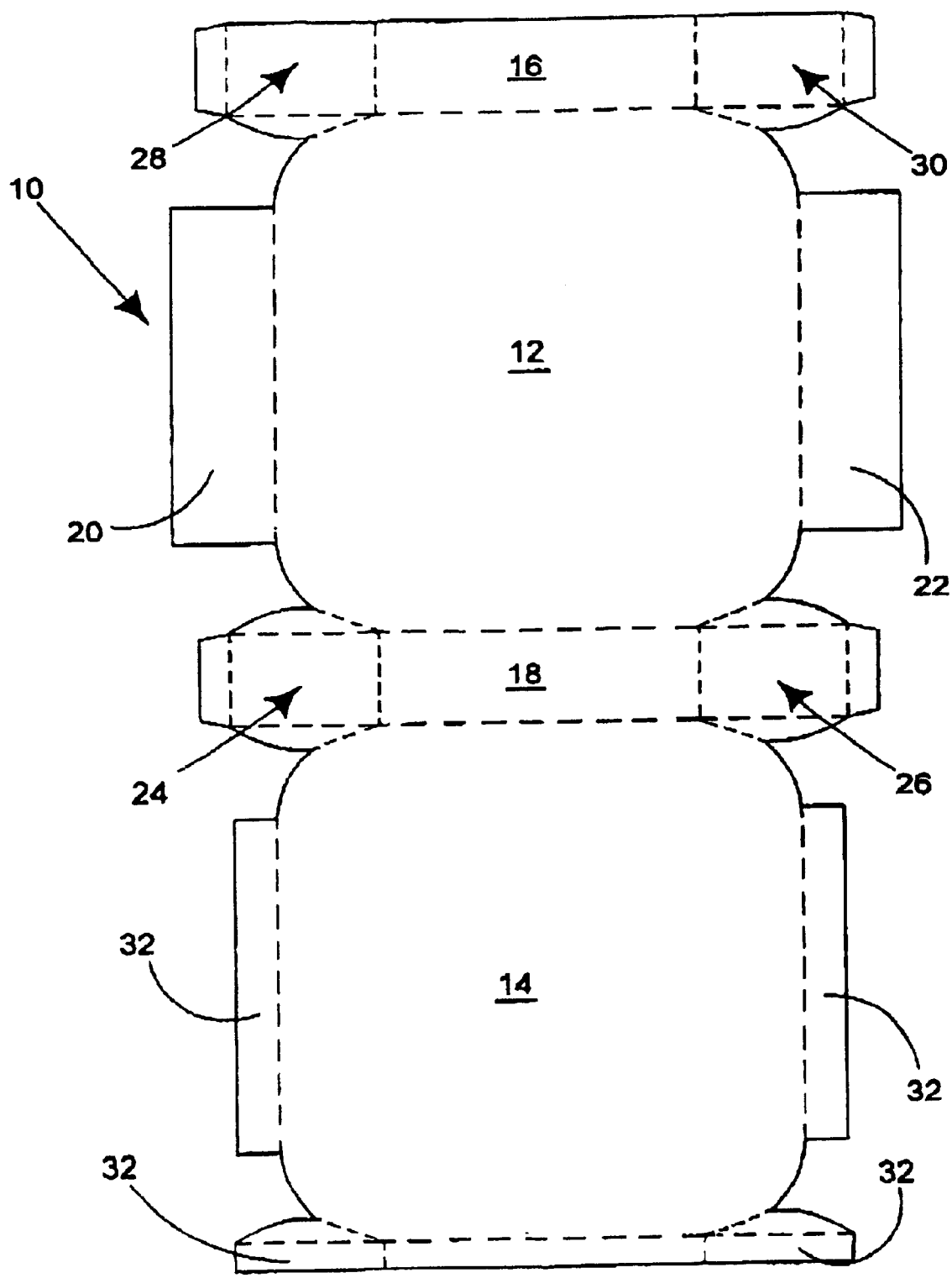
FIG. 1a is a side view of one type of carton supplied in a flat collapsed condition suitable for use with a machine according to the invention.

The machine according to the embodiments of the present invention illustrated in the drawings is capable of loading different types and shapes of carton with one or more articles, for example a pizza.

Figure 1B:
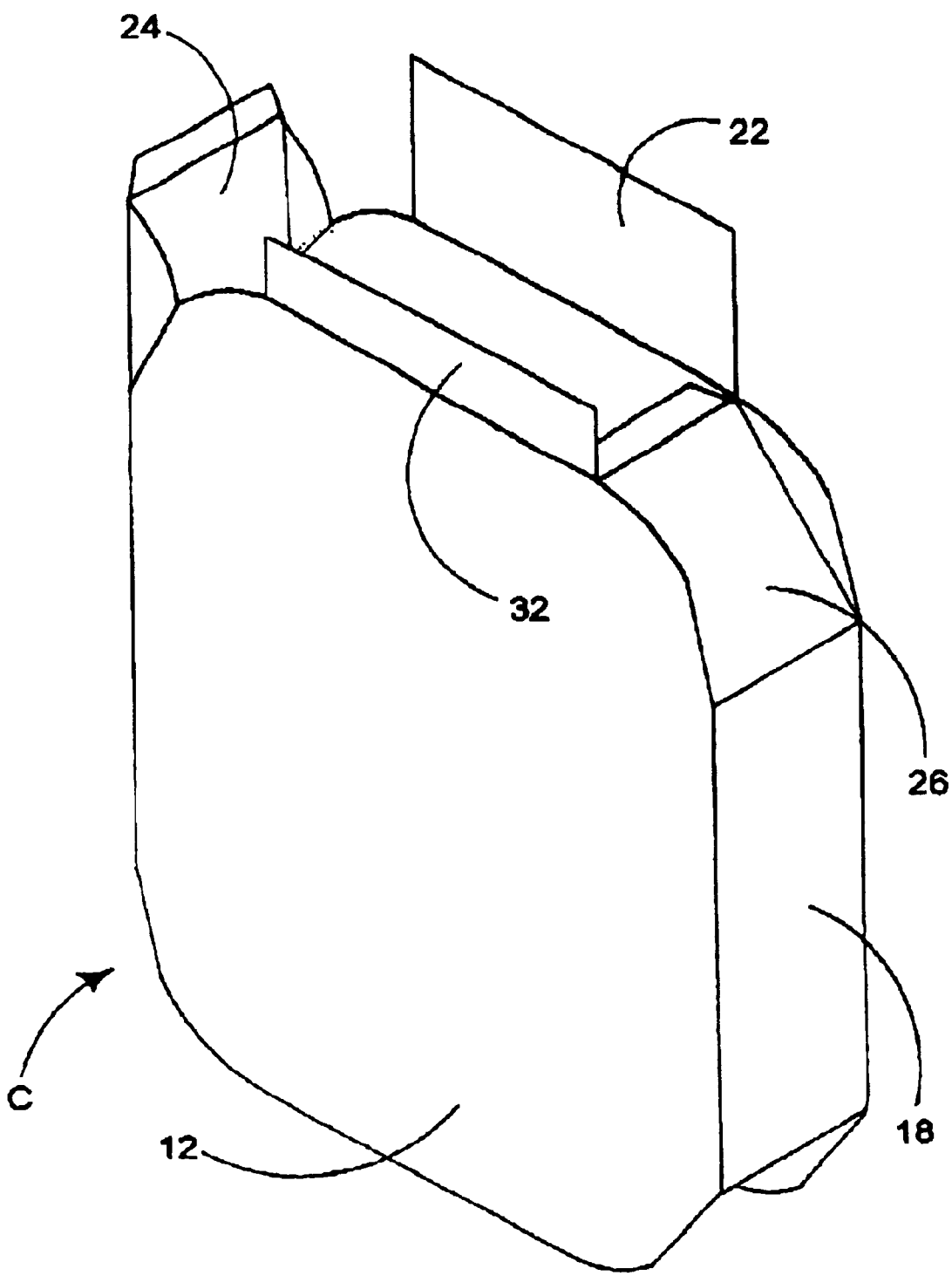

Referring to the drawings, and in particular FIGS. 1a and 1b thereof, there is shown one example of a blank 10 for forming an article carrier shown in FIG. 1b, in a set up condition ready for receiving the or each article. The blank is made from suitable foldable sheet material, for example paperboard. The blank 10 includes a top 12, a base 14 and opposed side wall panels 16, 18 hingedly connected one to the next. The carton 10 may further include opposed end flaps 20, 22 to form opposed end walls. Glue flaps are provided to secure the end walls and side panel 16 to the base 14.

There further comprises bevelled corner flaps 24, 26 and 28, 30 for forming a bevelled corner at each corner. The blank is folded and the glue flaps 32 are secured to the corner panels 28, 30 and end panels 20, 22 to provide a sealed carton, as shown in FIG. 1b.

Figure 2A:
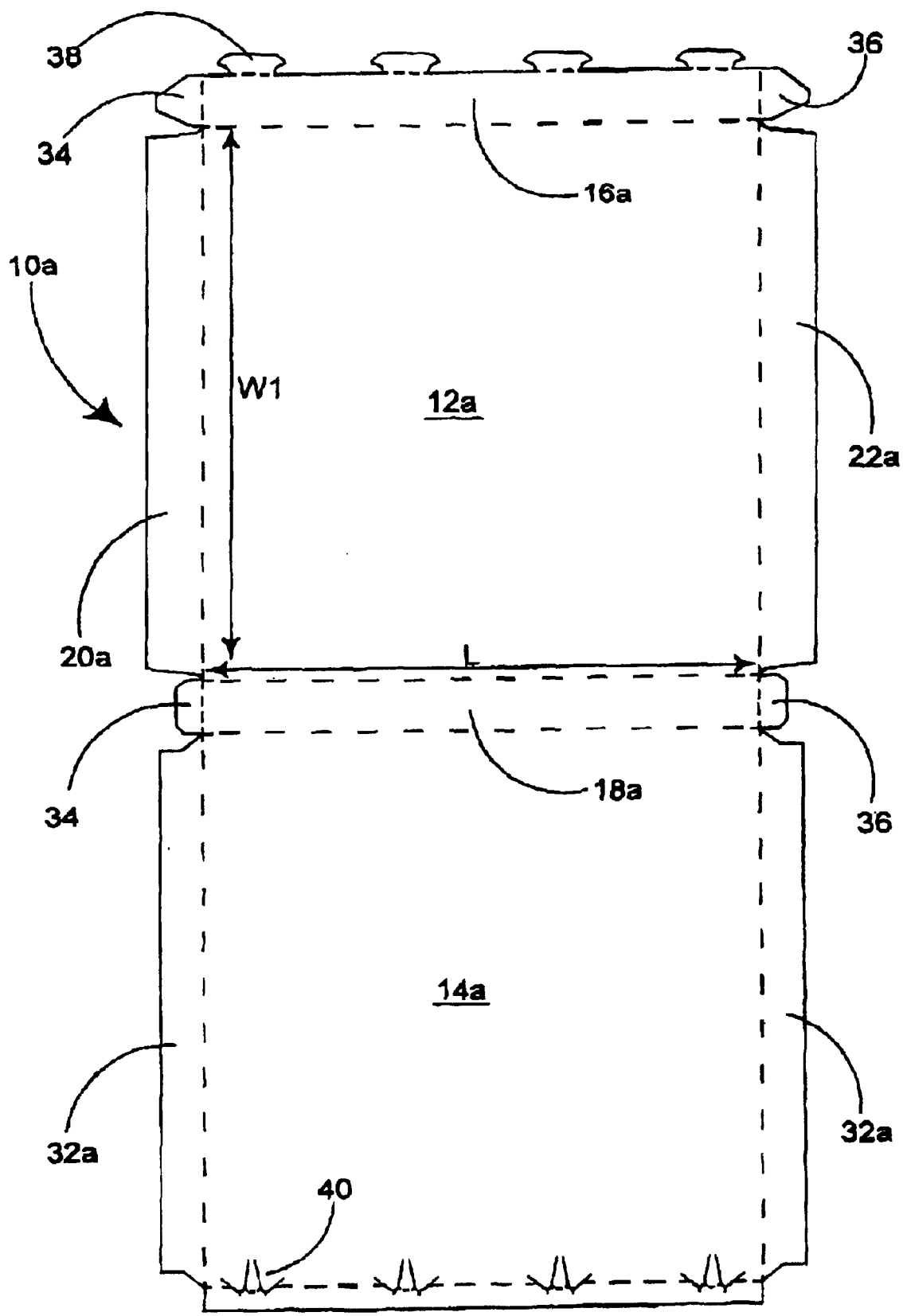
FIG. 2a is a perspective view of a wraparound carton blank suitable for use with a machine according to one or more aspects of the invention.
Figure 2B:
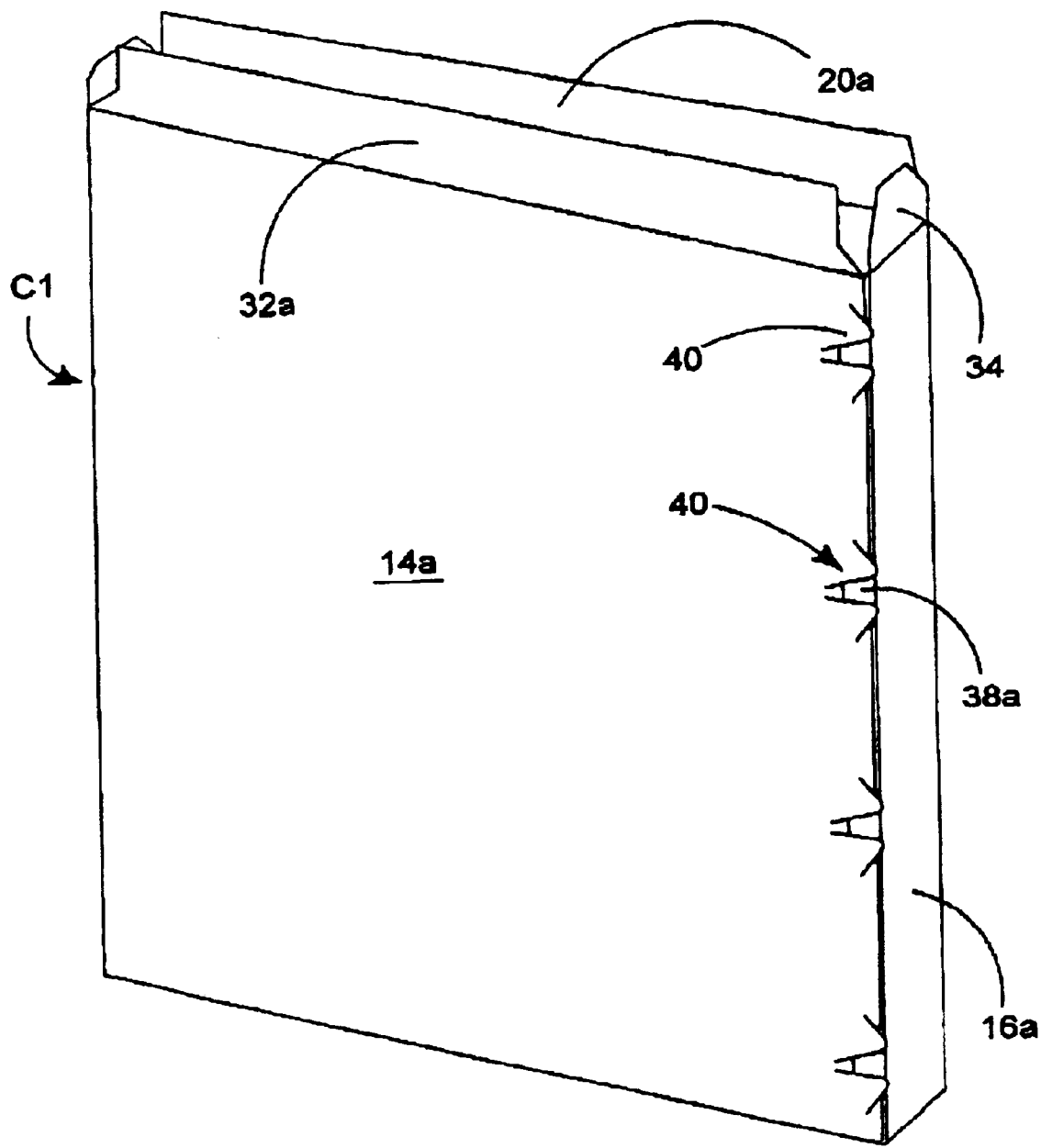

Referring to the drawings, and in particular FIGS. 2a and 2b thereof, there is shown another example of a blank 10a for forming an article carrier for use with the machine of the present invention, shown in FIG. 2b, in a set up condition ready for receiving the or each article. The blank is made from suitable foldable sheet material, for example paperboard and is to the embodiment shown in FIG. 1 and therefore like panels are designated by the same reference numeral, prefixed with the letter 'a'.

The blank 10a differs from the blank shown in FIG. 1 by the corner structure and the securing means to engage the top panel and the side panel. In this embodiment the corners are provided by end flaps 34, 36 that are folded into face contacting relationship with the adjacent side panel. The securing means comprises a plurality of tabs 38 struck from the side panel and corresponding apertures 40 in the base panel 14a. The blank is folded and tabs 38 are engaged in the apertures 40 and are secured together to provide a sealed carton C1, as shown in FIG. 2b.

It is envisaged that the cartons can vary depending upon the shape and/or quantity of articles to be packaged and accordingly, a machine in accordance with the present invention is adjustable in numerous respects so that it can process a wide variety of such cartons. The principle arrangements which are likely to be varied are shown in FIGS. 1a and 2a in which "W" is the overall width of the set up carton equivalent to the distance between the edges of the opposing side wall, "L" is the overall length of the carton when the base panels are closed.

Referring now to FIG. 3 of the drawings, there is shown a machine 50 for processing cartons of the type outlined above. The packaging machine is capable of continuously setting up and loading cartons and comprises an article conveyor 52 for conveying articles through the machine, carton feed apparatus 54 sequentially to deliver successive cartons from a supply in flat collapsed condition to a setting up station 56 of the machine. There may further comprise panel folding devices 58, 60 to fold the carton into a set up tubular condition and support means 62 adapted to be brought into contact with the carton during movement downstream so that the carton is maintained in a set up condition. Article loading apparatus 64 for loading at least one article into one or both ends of the carton is shown in FIG. 3. Thereafter the bevelled corners are formed, for those cartons with bevelled corners, by a folding apparatus 66. The ends of the loaded cartons are closed and sealed by fixed guides and securing apparatus 68, for example a gluing machine.

The upstream end of the machine is described with reference to FIGS. 4 and 5 which shows the carton feed apparatus 54 comprises a hopper 70 in which a multiplicity of cartons C in flat collapsed condition are held ready for processing. The cartons are removed from the hopper 70 sequentially by a feed mechanism 72, which in this embodiment is a rotary vacuum feeder 74, as is well known in the art.

Whilst the use of a rotary vacuum feeder to supply cartons to the conveyor is preferred, it is envisaged that the present invention can be used with other types of feeder mechanisms without departing from the scope of the invention.

The preferred hopper 70 is a "gravity feed" type whereby the carton blanks C are held in the hopper at an incline to provide a positive feed.

Figure 4:
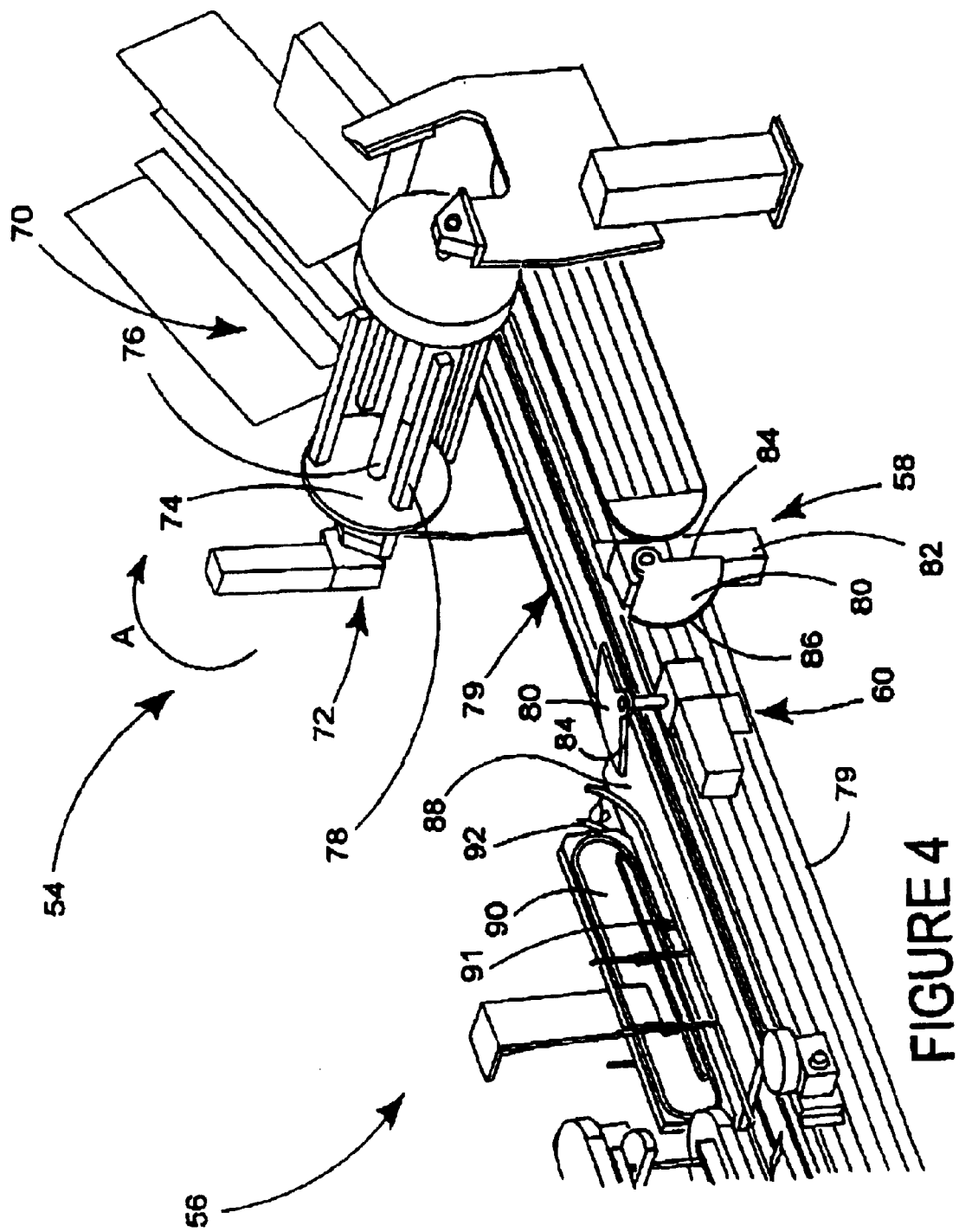
FIGS. 4 and 5 are perspective views of the carton supply infeed and set up stations of the machine shown in FIG. 3.

In use, the feeder mechanism 74 continuously and sequentially feeds cartons from the hopper to the infeed end of the machine and comprises a main shaft 76 mounted in a horizontal plane, that rotates pick up means in the direction indicated by the arrow "A", shown in FIG. 4. As the pick up means 78 rotates, suction cups (not shown) are moved in contact with a wall of carton C. A vacuum is then applied to the set of suction cups by the vacuum supply, as is well known, and the carton 10 is withdrawn and then transferred onto an endless conveyor 79 to move the carton downstream in a continuous forward direction to a set up station 56 and onto the loading station 64.

The preferred embodiment of the set up station 56 includes panel folding devices 58, 60 that are used for cartons that are required to be folded into a tubular structure, for example the carton C1 shown in FIG. 2. The folding devices 58, 60 are used to perform two folding actions on the carton. The first folding device 58 folds the carton about the fold line between the base and side panel 14$a$, 18$a$ (FIG. 2$a$) and into a perpendicular relationship such that the side and top panels 18$a$, 12$a$ are in a substantially vertical plane. Thereafter the second folding device 60 causes the top 12$a$ to be folded into a perpendicular relationship with the side panel 18$a$. The folding devices are similar and hence only unit 58 is described in detail with reference to FIG. 4.

As shown in FIG. 4, the preferred folding device 58 comprises an disc 80 mounted to suitable drive means, for example a servo motor 82. The servo motor 82 is controlled by control means, which can cause the rotational velocity of the disc 80 to be varied. The wheel 80 is preferably 'segment' shaped to define a leading edge 84 that contacts the carton to commence the folding. Thereafter, the inner surface 86 of the wheel abuts the panel to be folded and causes it to continue to be folded as described above. The remainder of the carton is held in place by a guide 88.

You will see that the wheel 80 of the folding device 58 rotates in the vertical plane, whereas the wheel 80 of folding device 60 rotates in the horizontal plane. Of course, the plane of rotation can be changed according to the required folds.

In order to complete the construction of the carton C into a set up condition the carton is moved downstream by the conveyor 79. The top panel is supported and moved forward by the or a lug 91 of an upper chain lug assembly 90, or other suitable conveyor to maintain alignment between the top and the base. The upper lug chain assembly 90 is driven by drive means, for example a servo motor and controlled by control means to move the top panel in aligned forward movement with the base and the velocity of the conveyor 79 and lug assembly 90 is adjustable by the control means to enable different carton types and shapes to be conveyed. Fixed guides 92 may be provided to minimise upward movement of the carton. Thus, the tabs and apertures 38, 40 can be readily brought into alignment to be secured together, by suitable securing means 93, for example a punch lock mechanism known in the art.

Figure 5:
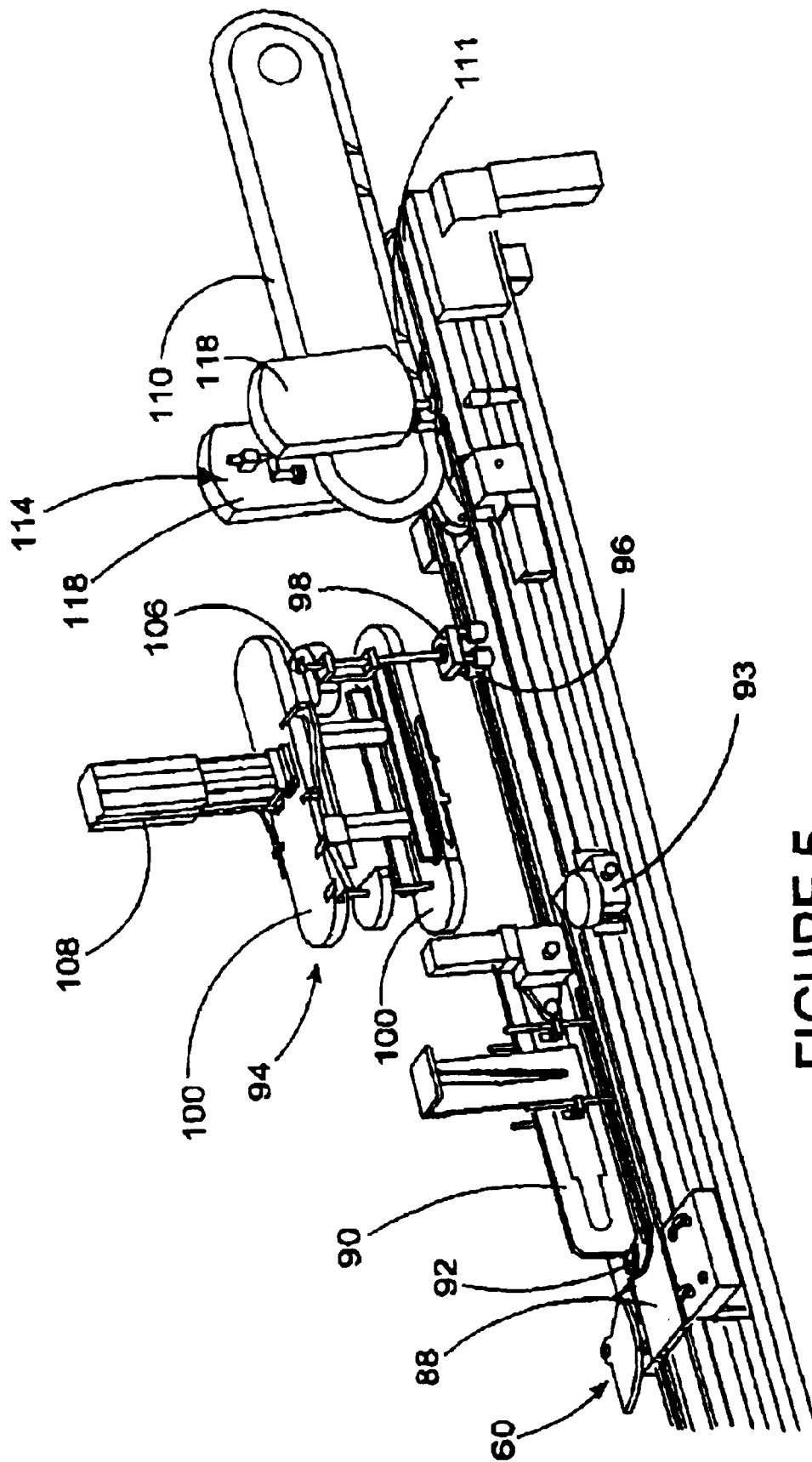

The carton, in a part erected tubular form, is moved forward to a carton manipulating station 94, shown in FIGS. 4 and 5. In this embodiment, the carton of the second embodiment is manipulated through 90° in order that the ends 20$a$, 22$a$ of the tubular carton 10$a$ are located along the sides of the machine to facilitate loading. However, the apparatus hereinafter described can be used in other applications to be fitted to new machinery or on a retrofit basis where it is desired to manipulate a carton by rotation, for example at the outfeed end of a machine.

Figure 6:
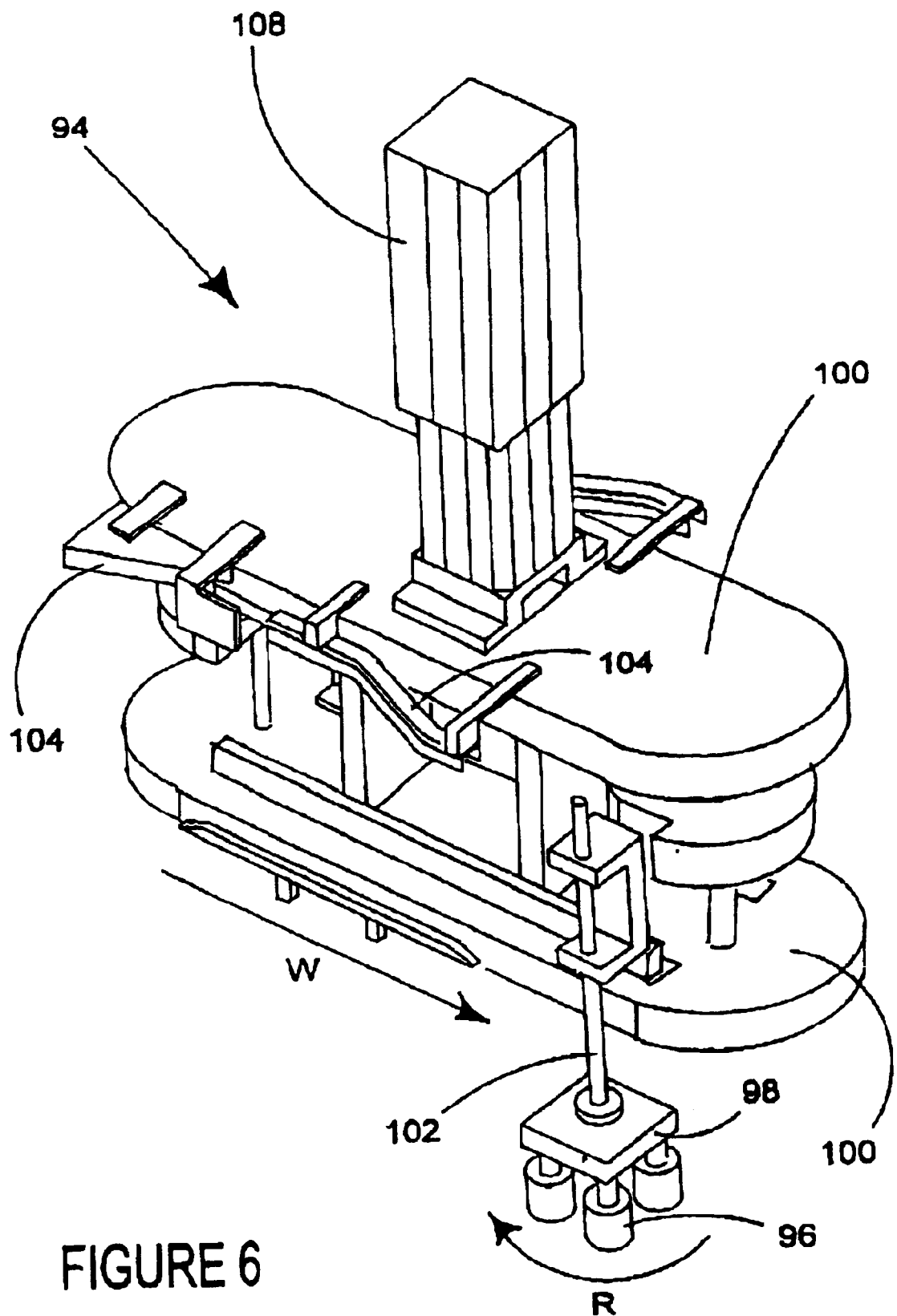
FIG. 6 is a simplified view of the carton manipulating apparatus according to another aspect of the invention.

In order for a carton to be manipulated, the preferred apparatus 94 is provided with a plurality of suction cups 96, for example four, mounted to a frame 98 which is itself attached to an endless conveyor 100 of predetermined locus, defining a working reach W and a return path, shown in more detail in FIGS. 5 and 6. The conveyor 100 is driven by suitable drive means, for example a servo motor. The suction cup frame 98 is mounted to rotating device which imparts intermittent rotary drive to the frame. In this embodiment, the rotary action is provided by a drive rod 102 connected to a cam track 104 via a cam follower 106 (FIG. 5) housed in a housing to provide a uniform path for the suction cups as the endless conveyor moves forward. The path is adapted to cause the suction cups to rotate through the desired angle of rotation R during the working reach.

Thus, the carton is engaged with the suction cups 96 at the upstream end of the working reach W which is achieved by lowering the suction cups 96 on to the carton 10$a$. A vacuum is applied and the suction cups 96 are engaged with the carton. As the suction cups move along the working reach, the cam follower follows the path which causes the suction cup frame 98 and the carton to rotate through approximately 90°. A vacuum break is provided to cause the suction cups to release the carton at the downstream end of the working reach. The carton is then in the position that the ends are positioned to be side loaded with an article A.

In this embodiment, the carton manipulation apparatus 94 is mounted to a frame 108 which can be raised and lowered between operative and inoperative positions. Suitable drive means, for example a servo motor, is provided to move the apparatus; the drive means is controlled by a controller hereinafter described.

It is common for the length L of the carton to be a different dimension to the width W1, shown in FIG. 2$b$, so that after the carton has been rotated, the pitch (i.e. the spacing) between cartons will necessarily change. An upper conveyor 110 is provided to move the carton forward at a slower or faster velocity relative the conveyor 79 in order that the throughput of cartons is maintained at the same rate.

Therefore, to maintain continuous forward feed of the cartons, the velocity of the cartons will need to be changed.

For example, when W1<L, the spacing will be greater so the velocity should increase to compensate for it. Likewise, when W1>L the velocity will be decreased to achieve a change in carton flow speed.

Figure 8:
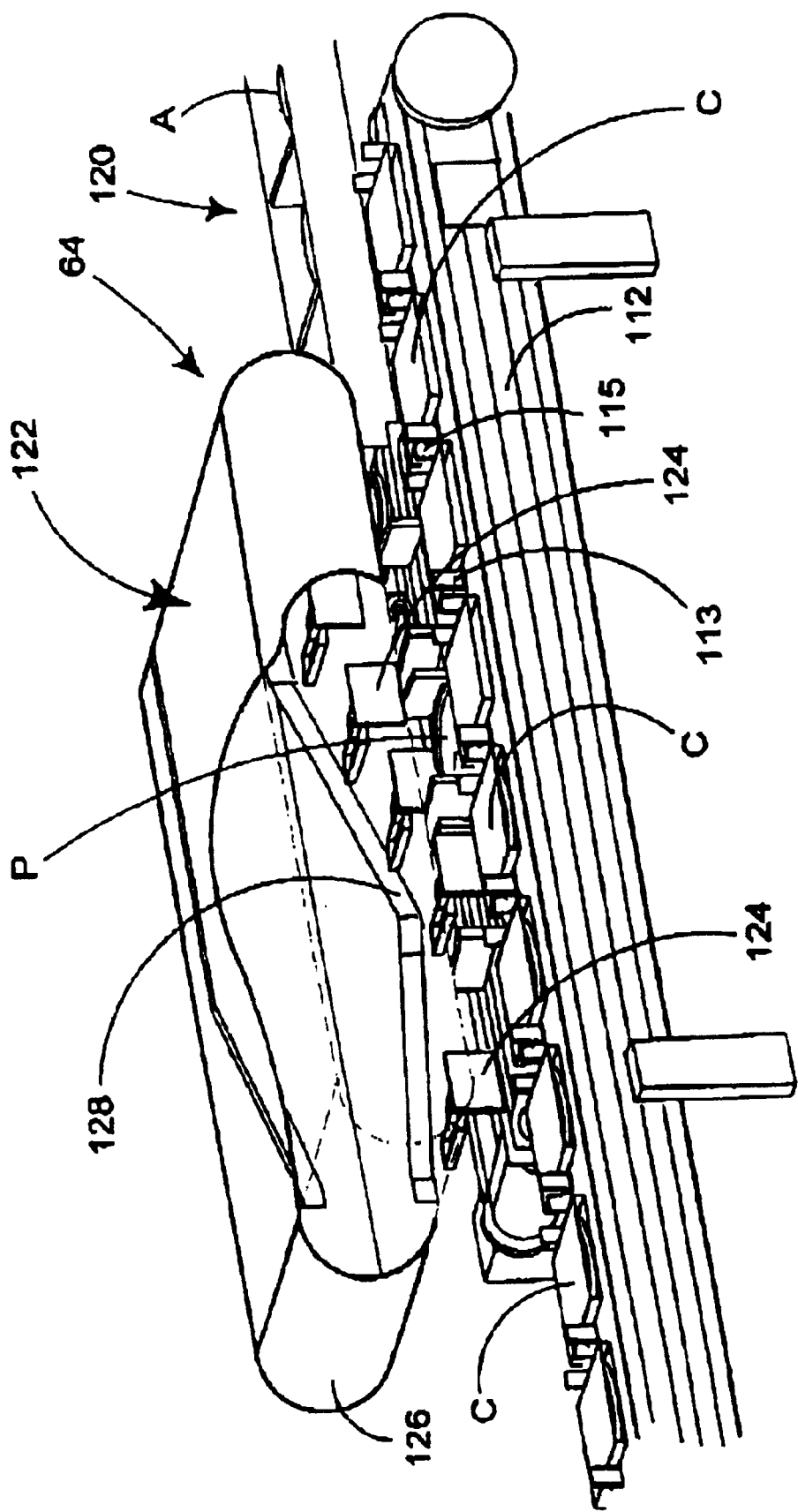
FIGS. 8 and 9 is a perspective view of the loading station and outfeed end of the machine.
Figure 9:
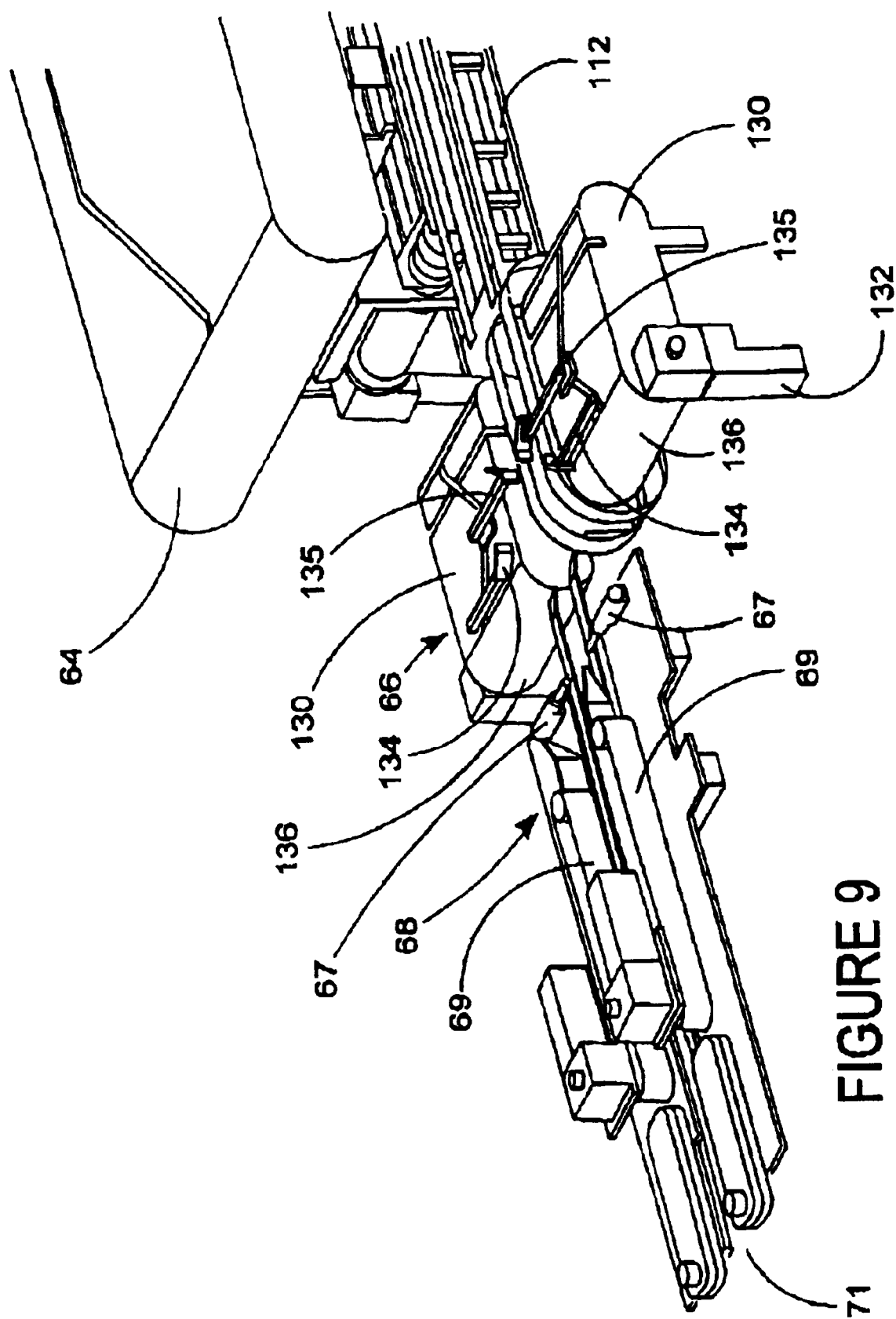

In this embodiment, the lugs 111 of upper conveyor 110 engages the trailing edge of the carton to push it forward towards the second endless conveyor 112, shown in FIGS. 8 and 9, and onwards to the loading station 64.

In one class of embodiments the carton is supplied to the packaging machine in a flat collapsed condition. For example the embodiment, shown in FIG. 1, could be pre-glued and the glue flaps secured to their corresponding panels as described above. These cartons 10 do not need to undergo the same folding and securing operation by folding apparatus 58, 60 and manipulation means 94 described above, so the carton can be loaded in the hopper 70 with the end flaps 20, 22, 32 correctly oriented for side loading. The cartons 10 are placed on the conveyor 79 by the feeder 72 but the carton is conveyed to a set up device 114, shown in FIGS. 5 and 7. The control means and drive means is provided to move the folding apparatus 58,60 and the carton manipulating apparatus 94 in to an inoperative position so that they do not interfere with the carton blanks 10 being conveyed by the conveyor to the set up device 114.

Figure 7A:
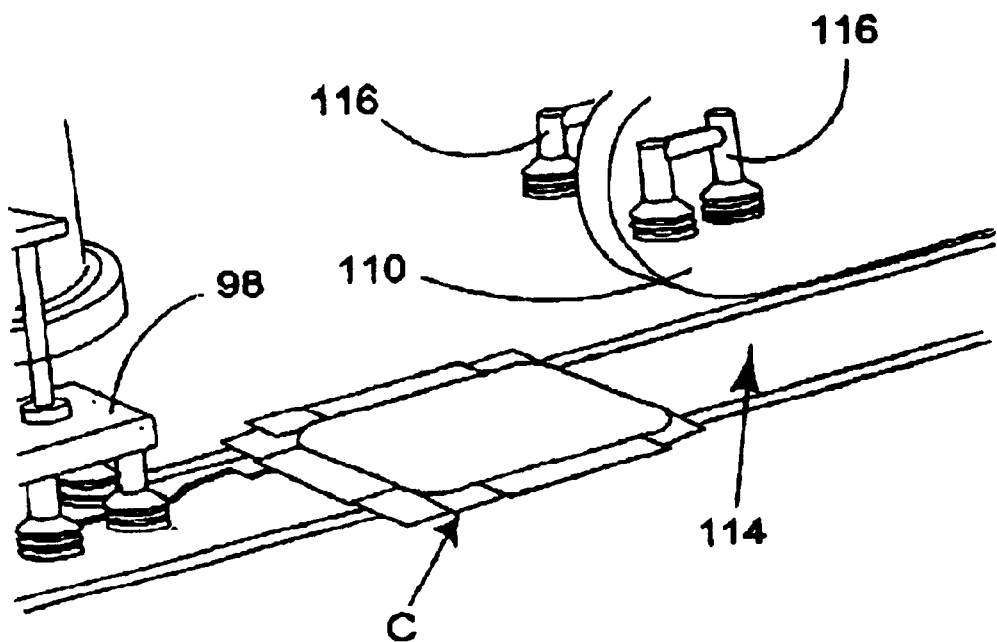
FIGS. 7A and 7B illustrate the set up apparatus adapted for use with the carton shown in FIG. 1.
Figure 7B:
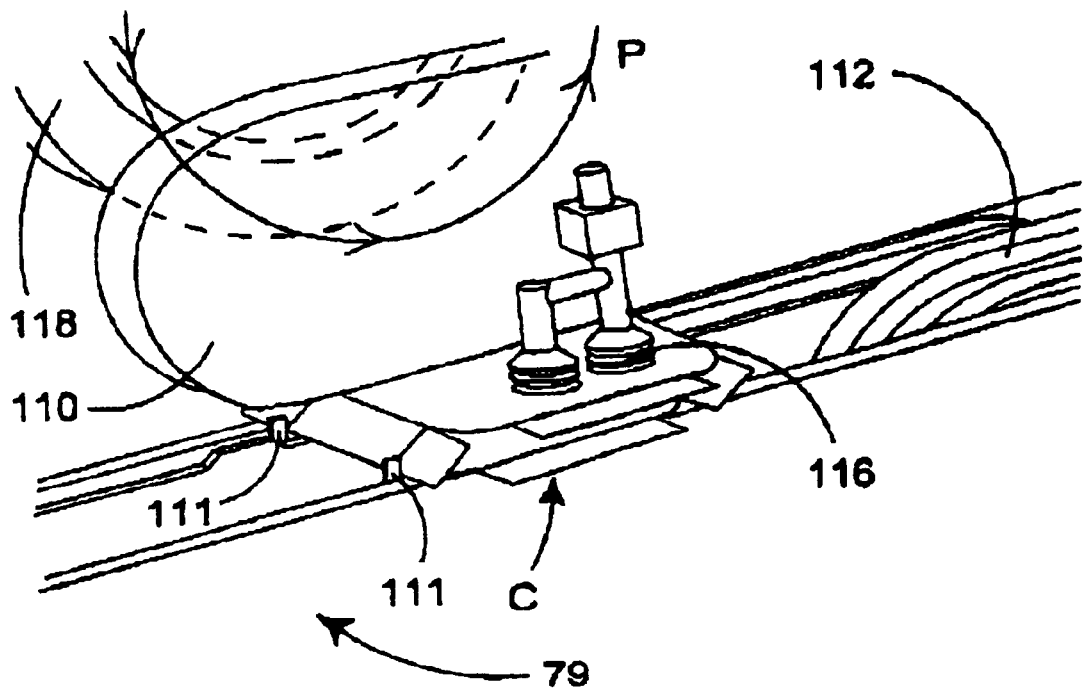

FIGS. 7A and 7B illustrate the operation of the set up device 114, which comprises carton pick up means 116, for example suction cups that engage the top panel and separate it relative the base panel. The base is prevented from being raised by fixed guides (not shown) retaining the lower end flaps or other suitable means known in the art. The pick up means follow a predetermined path P by an endless chain 118 that allows forward and vertical movement to ensure the carton continues to move forward. Thus, the carton is erected as shown in FIG. 7b, which is held in an erected condition by leading and trailing lugs of a second conveyor.

The carton of either type is then moved to the loading station 64 (FIG. 3) to be loaded with one or more articles by second conveyor 112 which has mounted to it leading and trailing lugs 113, 115 shown in FIG. 8. In this embodiment, the machine is adapted to load a pizza into the carton. The articles A are supplied to the loading station on a second conveyor 120 shown in FIG. 8 which runs parallel to and is synchronised with the first and second conveyors 79, 112 by the control means, whereby each article, in this embodiment, is separated by suitable metering means. An overhead plunger mechanism 122 is provided to push the article towards the carton, shown in FIG. 8. The mechanism comprises a plurality of guide elements 124 mounted to an endless chain 126 to impart forward movement. The endless chain is driven by suitable drive means (not shown) to be synchronised with the article conveyor 120 and the carton conveyor 79 by control means. The guide elements 124 are moveable in a lateral plane by a cam track 128 and cam follower (not shown) and thus push the article P into one end of the carton. Fixed guides (not shown) maintain the position of the carton relative to the pizza in the lateral plane to enable the pizza to be inserted into the carton during the continuous forward movement.

The next stage is for the corners to be constructed in those cartons 102 with bevelled corners. This is achieved by the folding apparatus 66 shown in FIG. 9. In this embodiment, the folding apparatus 66 comprises opposed lug assemblies 130 driven by suitable drive means, for example a servo motor 132 and controlled by a controller. The apparatus is capable of folding bevelled corners inwardly folding end flaps, illustrated in FIGS. 1 and 2 respectively.

Figure 10:
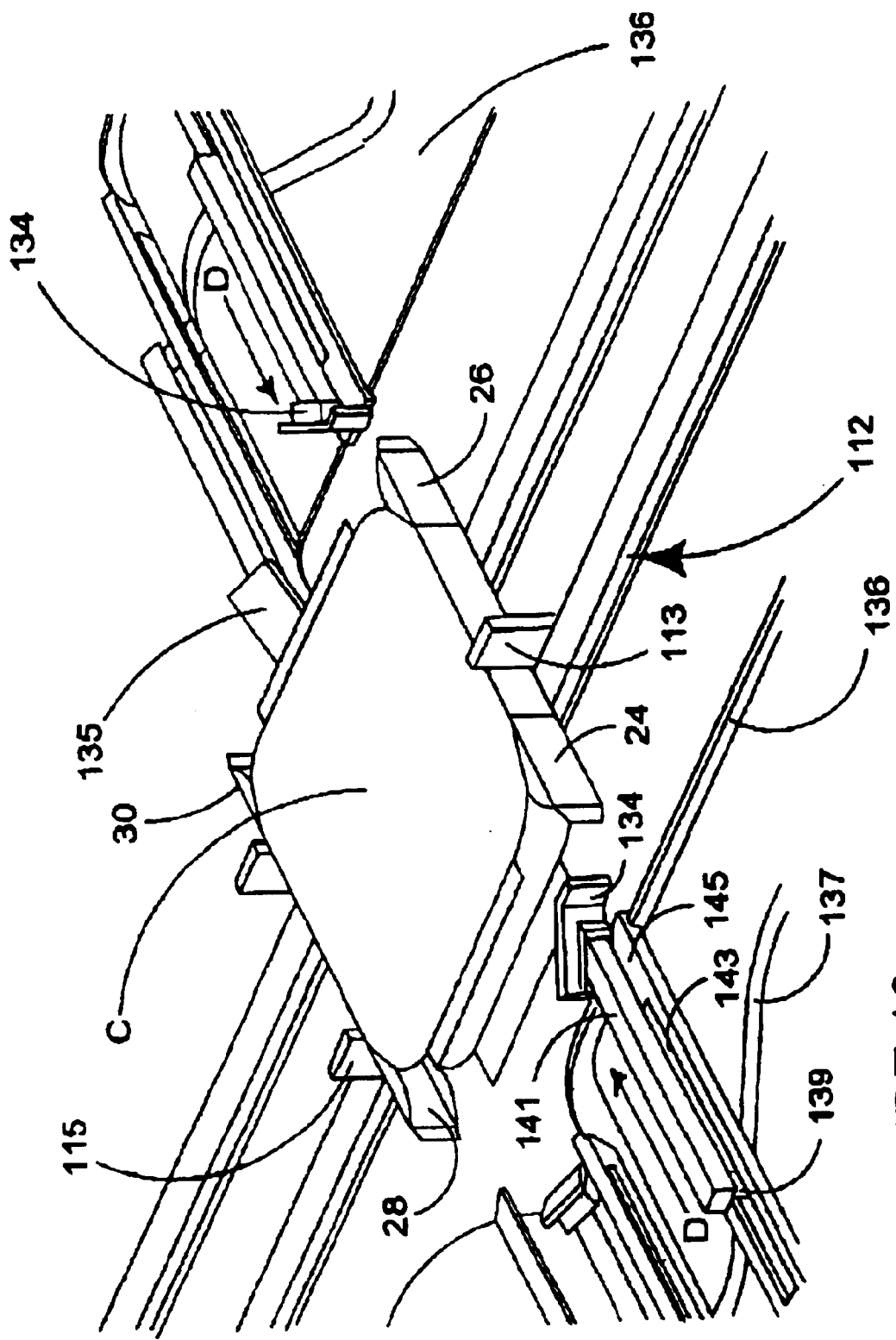
FIGS. 10, 11 and 12 are perspective views of the module for forming the bevelled corners of the carton shown in FIG. 1.

Leading and trailing lugs 134, 135 are mounted to a continuous belt 136 which is positioned at a height such that the lugs 134, when in use, will contact the leading and trailing corner flaps of the cartons so as to move the flaps. This is explained further with reference to FIGS. 10, 11 and 12.

The apparatus 66 is operable such that the individual leading lugs 134 are periodically positioned in front of cartons causing each carton to contact the lug 134 and in so doing to reposition the end or corner flap on the carton. A cam 137 and cam follower 139 shown in FIG. 10 cause the leading and trailing lugs to move towards and away from the carton.

In this embodiment, the cam follower is mounted to a shaft 141 which is connected to the leading or as the case may be trailing lug 134, 135. The cam follower 139 is mounted in an elongate aperture 143 of a support member 145 which is connected to the conveyor 136.

The apparatus 66 is further operable to increase the velocity of the lugs periodically so as to bring the individual trailing lugs 135 into contact with the trailing corner flaps of the cartons, thus repositioning the trailing corner flap.

In the present embodiment, a single variable speed continuous belt 136 is utilised. However, a plurality of belts may be utilised. In addition, a single roller with one or more lugs attached thereto may be utilised without the use of a continuous belt.

Figure 11:
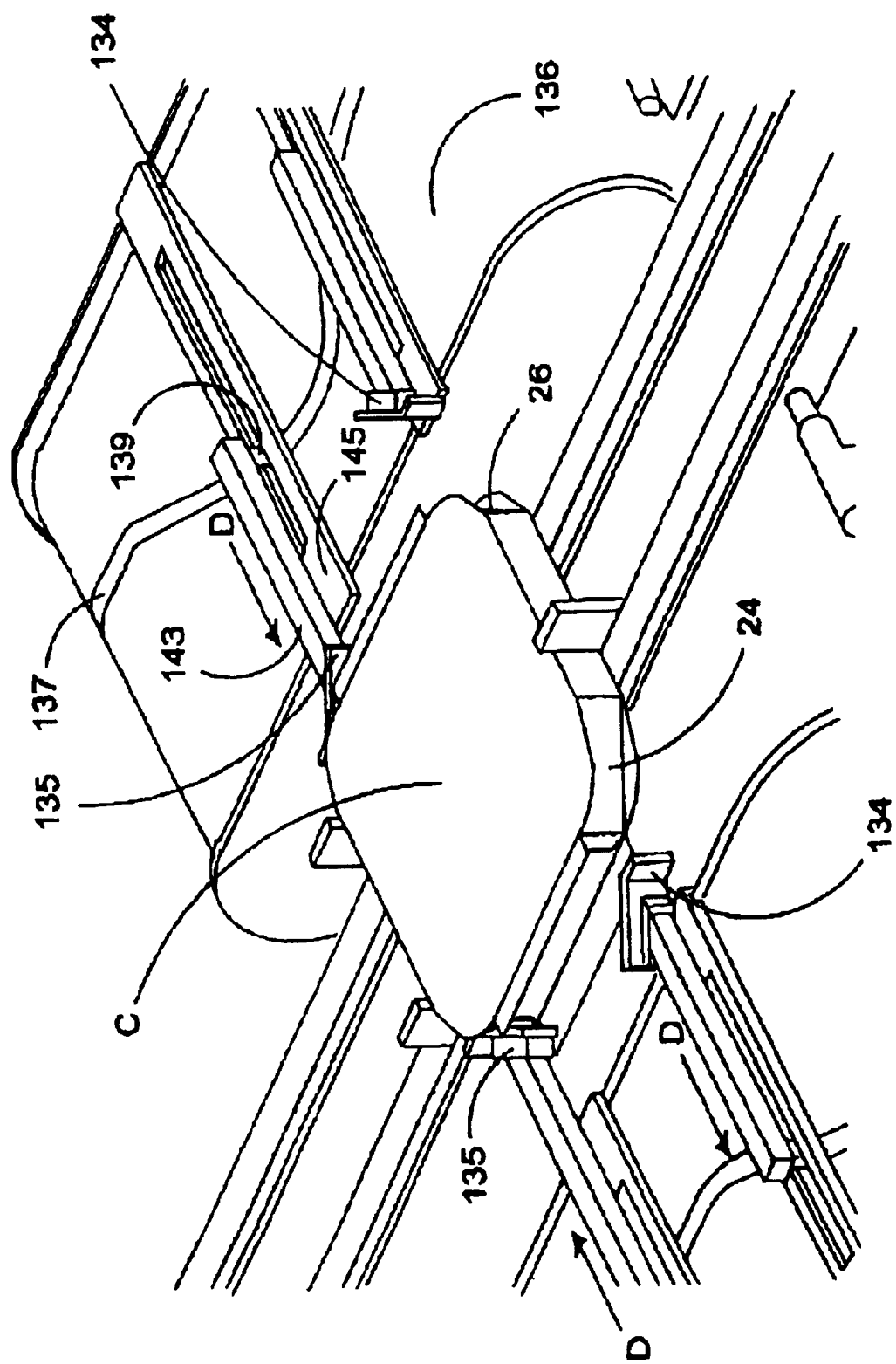
Figure 12:
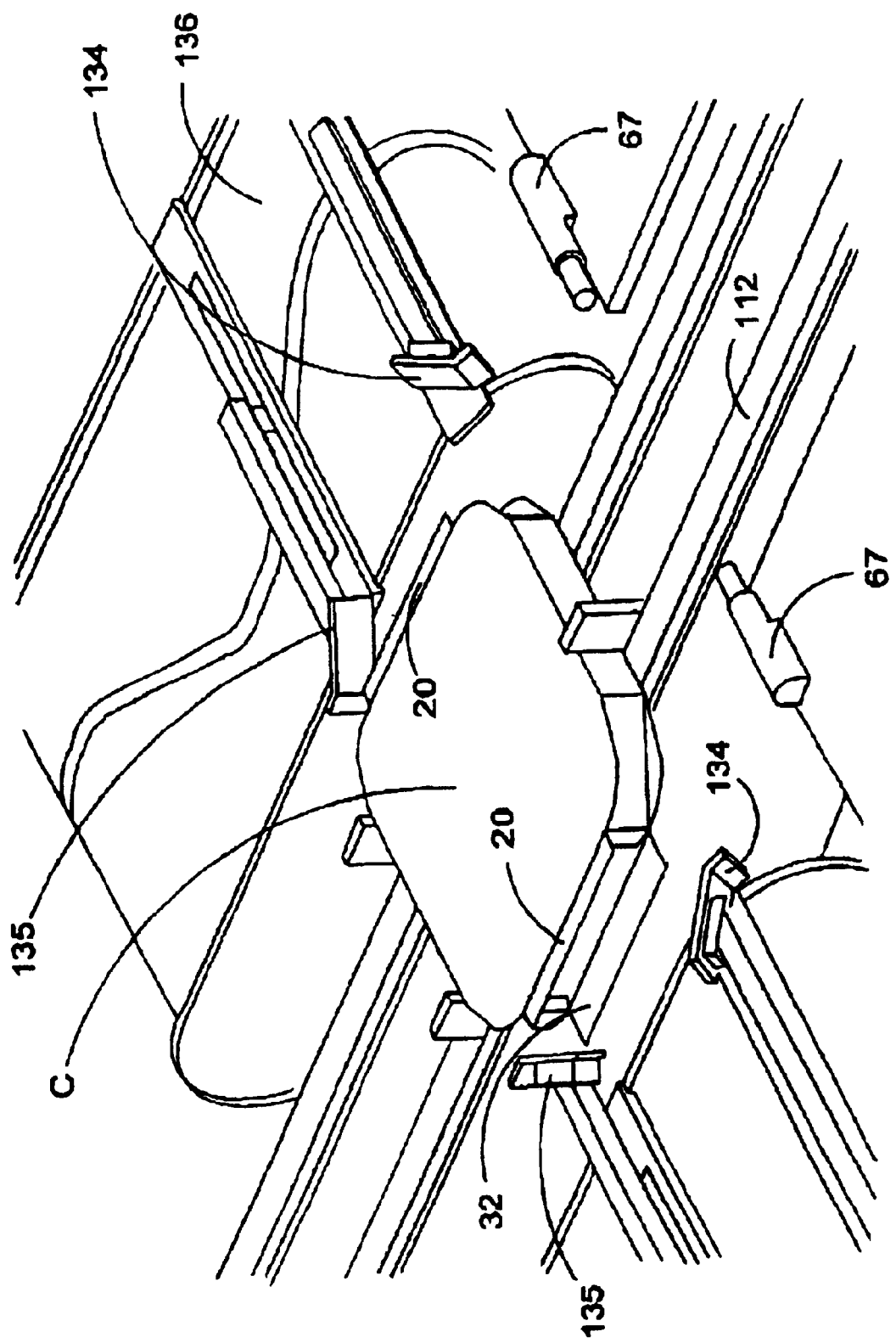

A leading lug 134 is moved into position in front of a carton at a speed less than that of the cartons on the conveyor then a carton will contact the lug and the leading corner flap will be repositioned by moving the lug in a lateral direction D with respect to the movement of the carton shown in FIG. 11. Thereafter, the controller increases the speed of the drive means which causes the trailing lug 135 to increase in speed relative the carton C to bring it into contact the trailing corner flap 28 of the same carton, and the lug is moved in a lateral direction D with respect to the movement of the carton to reposition the flap shown in FIG. 12.

The apparatus 66 includes a controller arranged to control the speed of the continuous belt 136 during use. This controller may be a dedicated processor or may be a control means for a packaging machine with which the apparatus 66 is used, which is adapted to control the apparatus 66. Alternatively, the controller may preferably be a known, programmable servo control system.

In some embodiments, the controller receives information from a sensor (not shown) arranged to detect the speed of the continuous belt; which may detect the speed of the belt directly. In addition the apparatus may include means in the form of a sensor for receiving information regarding the speed of the cartons on the conveyor which is transmitted to the control means. Alternatively, there may be manual input means through which the speed of the cartons on the feed path may be input into the control means.

Once the bevelled corners have been formed the carton continues to move forward and the end flaps 20, 22, 32 are folded into overlapping relationship by fixed guides and are secured together by suitable securing means 68, for example a glue machine 67, as is well known in the art. Pressure is applied to the end flaps by pressure belts 69 to hold the carton in place while the glue sets and the fully loaded and enclosed carton is transferred to the outfeed end 71 of the machine.

Figure 13:
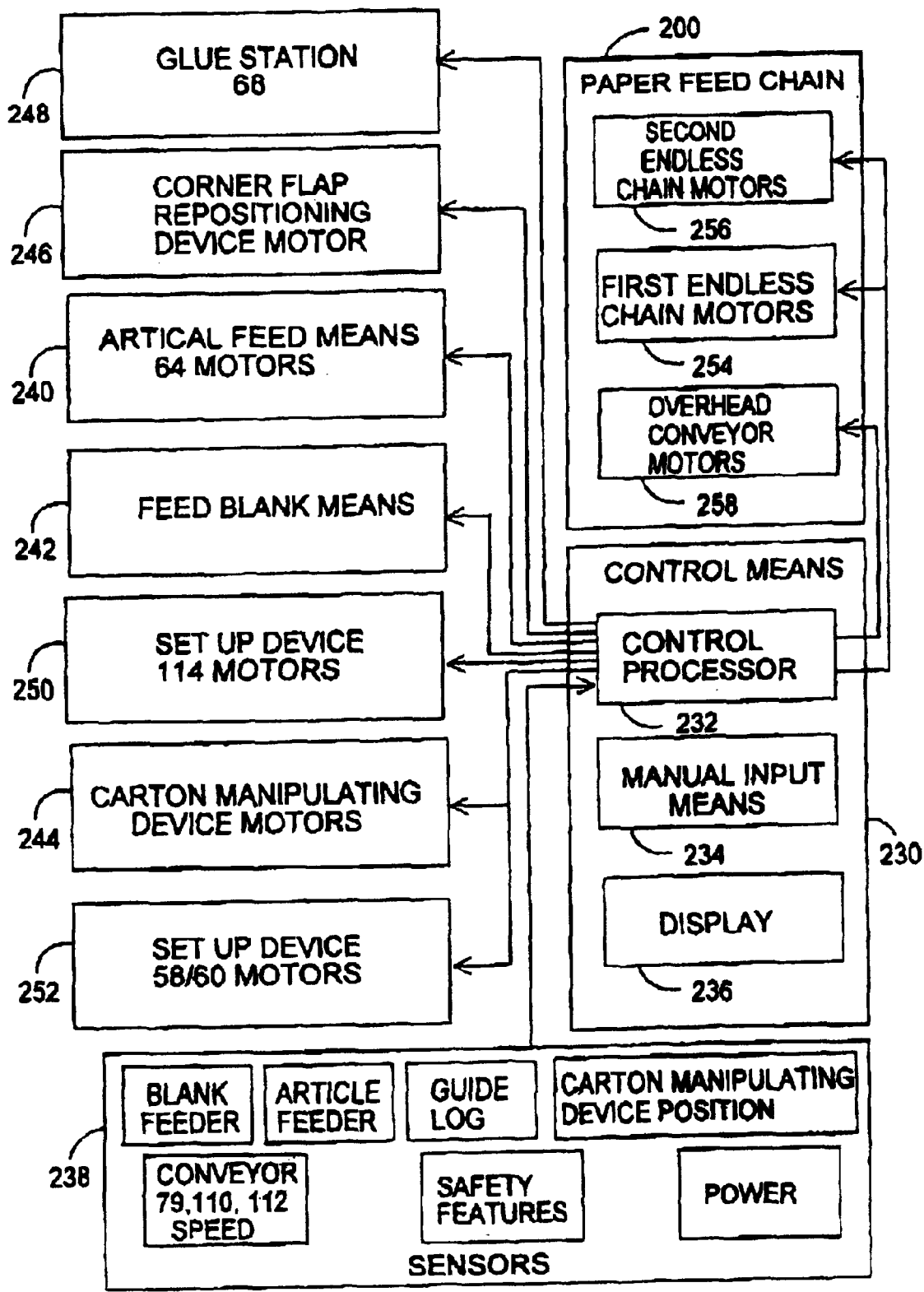
FIG. 13 is a block circuit diagram illustrates the electrical and electronic control of the packaging machine.

FIG. 13 illustrates a control means 230 having a central processor 232, a manual input means 234 through which specific instructions can be programmed, and a display 236 which indicates useful information to the machine operator. The central processor 232 and the display 236 can display operational information, such as, the speed of operation of the machine and its compliance with particular safety requirements, in the normal manner. In addition, the central processor 232 and display 236 can also indicate information specific to the present machine, such as the blank feeder 54, the conveyors speed, the article feeder and carton manipulating device position. All of this information is provided through sensors shown generally at 238 or by known positions of the servo motors used.

As discussed above, the control means 230 also controls the positions of the moveable components as well as the speed of movement of variable speed components. For example, the central processor 232 controls the motors 140 which power the feed means, conveyors 79, 110, 112 and 64 which move the blanks and articles to be packed through the machine.

The processor 232 also controls the set up devices 58, 60 and 114 and the carton manipulating device 62 as well as the position of the corner flap repositioning device 66.

Suitable control means can be included to position the set up devices and manipulating device 62 between operative and inoperative positions. The control means may also control the motors driving each of the endless chains to control and adjust the speed and to synchronise carton throughput according to the carton type and/or size.

Additionally, the control means may control the corner flap repositioning device to place the device in operative or inoperative conditions, as described above.

As will be discussed below the positions and speed of these devices can be input manually or a specific pre-written programme can be loaded into the central processor for control of the packaging machine. Also, for the controlled change over of the machine from one carton type or size to another can be the result of a pre-written program or a manual input signal, as discussed below.

The change over process from the first carton type in FIG. 2 to another type shown in FIG. 1 is controlled by the control means and is started either due to a manual input request or through the machine coming to the end of a pre-programmed run.

The first stage in the system is to detect a change in carton type, by manual input or sensor. Thereafter, the set up devices 58, 60 are moved into an operative position and the carton manipulating device 94 is stopped and moved to an inoperative position. Thereafter the set up device 114 is started whereby the endless chains 118 and suction cups 116 are synchronised with conveyor 79 and the cartons C. The second conveyor 112 and overhead conveyor speeds are also synchronised with the first conveyor speed to maintain constant flow-through the machine.

Finally, the corner repositioning apparatus 66 is stopped and the article feed means is controlled so that the appropriate number of articles is provided to the loading station 64 at the appropriate time.

This process is reversed when changing the carton types from the second to the first types. As discussed above, the main changes relate to placing those inoperative devices in an operative mode. Also the overhead conveyor 110 and second conveyor 112 will need to increase or decrease in speed as determined by the control means for the reasons discussed above.

By pre-programming the control system, the adjustments to the machine required to change from packaging one carton type to another carton type can be pre-set, thus reducing the amount of downtime when interchanging carton types or styles. According to this invention, the speed of operation of the apparatus is improved as well as its efficiency and durability. An advantage of the present invention is the flexibility offered by the system.

Although the preferred embodiment described herein is for loading pizzas into cartons, it will be recognised that the invention is not limited to cartons for pizzas. The invention may be used with machines for packaging cans, paperboard 'bricks', bottles and other containers into cartons.

Further, the various elements of the machine, for example carton manipulating apparatus, folding apparatus, set up station or loading station can be manufactured separately as a module to be incorporated into new machines or supplied on a retrofit basis without departing from the scope of invention.

Moreover while the preferred embodiment described herein shows as part of the machines for loading containers to keep two types of carton the invention is not limited to cartons of this type, as will be recognised by those skilled in the art the invention may be used with both wraparound and unloading cartons or where it is desired to manipulate cartons through any desired angle of rotation.

It will be understood that the carton erecting mechanism and manipulating mechanism of the invention has been illustrated with reference to a specific embodiment and that numerous modifications are possible within the scope of the invention. The carton erected mechanism is able to process cartons comprising numerous configurations of groups of articles covering a range of carton size and shape, without undue time being spent in adjusting the mechanism.

What is claimed is:

1. A packaging machine of the end-loading type in which sleeve type cartons are loaded in a direction which is transverse to their feed direction through the machine, said cartons having leading and trailing side flaps to be closed after the carton is loaded as the carton feeds through the packaging machine at a carton feed speed, the machine comprising side flap closing means which transversely linearly enter the carton feed path to close said side flaps, said side flap closing means including leading closure lugs having control means controlling drive means to move the leading closure lugs longitudinally linearly in said carton feed direction at a speed less than the carton feed speed and simultaneously transversely linearly so as to engage and close the leading side flaps and thereafter to move the trailing closure lugs longitudinally linearly in said carton feed direction at a speed greater than the carton feed speed and simultaneously transversely linearly so as to engage and close the trailing side flaps.

2. A packaging machine according to claim 1, wherein said leading and trailing closure lugs are cam driven to move the closure lugs along a path parallel to the carton feed direction and simultaneously tranversely to the carton feed direction, and said control means controls the speed of said drive means dependent upon the speed of the cartons in said feed path.

3. A packaging machine according to claim 1, wherein said control means varies the speed of the lugs to be within the range of ±1 to 30% of the speed of cartons in said feed path.

4. A method for closing leading and trailing side flaps of a pre-loaded sleeve type carton as the carton feeds through the packaging machine at a carton feed speed which method comprises the steps of causing leading side flap closure means transversely to enter a feed path for said cartons and simultaneously to drive the leading side flap closure means in a feed direction at a speed which is less than the carton feed speed so that the leading side flap closure means engages and closes said leading side flaps, causing trailing side flap closure means transversely to enter said feed path and simultaneously to drive the trailing side flap closure means in the feed direction at a speed which is greater than that of the carton feed speed so that the trailing side flap closure means engages and closes said trailing side flaps.

5. A method according to claim 4 wherein transverse movement of said leading and trailing side flap closure means is cam driven to move the closure lugs along a path parallel to the carton feed direction and simultaneously tranversely to the carton feed direction, the speed of operation of said side flap closure means being controlled in dependence on the speed of carton feed in said feed path.

6. A packaging machine of the end-loading type in which sleeve type cartons are loaded in a direction which is transverse to their feed direction through the machine, said cartons having leading and trailing side flaps to be closed after the carton is loaded as the carton feeds through the packaging machine at a carton feed speed, the machine comprising side flap closing means which transversely enter the carton feed path to close said side flaps, said side flap closing means including leading closure lugs having control means controlling drive means to move the leading closure lugs longitudinally in said carton feed direction at a speed less than the carton feed speed and simultaneously transversely so as to engage and close the leading side flaps and thereafter to move the trailing closure lugs longitudinally in said carton feed direction at a speed greater than the carton feed speed and simultaneously transversely so as to engage and close the trailing side flaps, said leading and trailing closure lugs being cam driven to move the closure lugs along a path parallel to the carton feed direction and simultaneously tranversely to the carton feed direction.

* * * * *